July 24, 1928. 1,678,168
E. P. SEGHERS
TRAP
Filed July 2, 1923 2 Sheets-Sheet 1
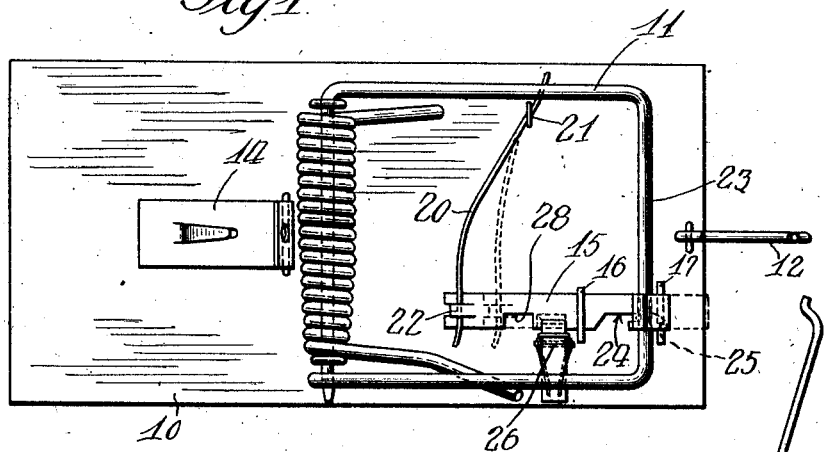
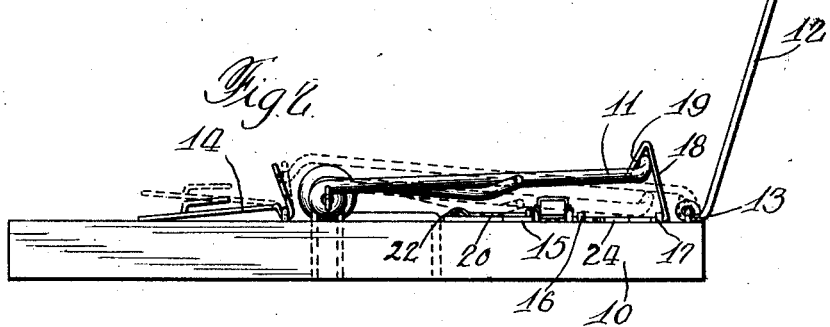
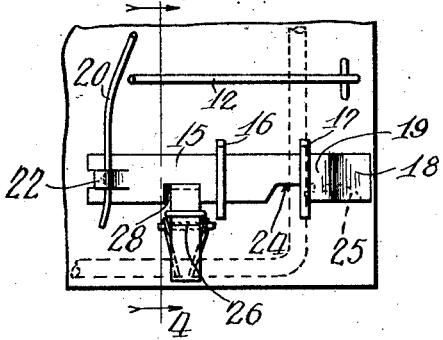
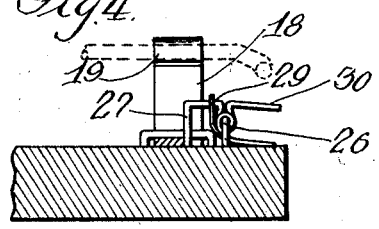
Witness: Carl S. Magnusson.
Inventor: Emiel P. Seghers
By Nissen & Crane Attys

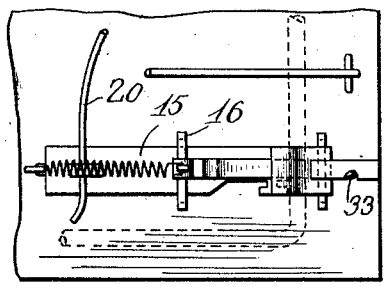
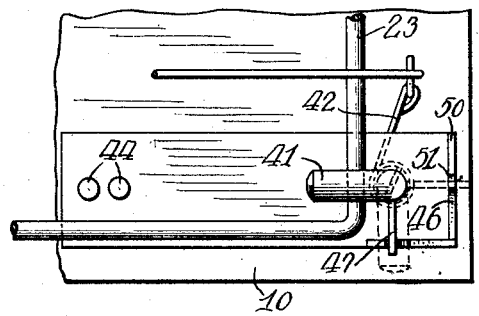
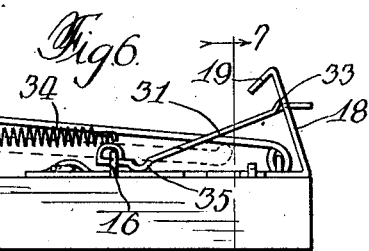
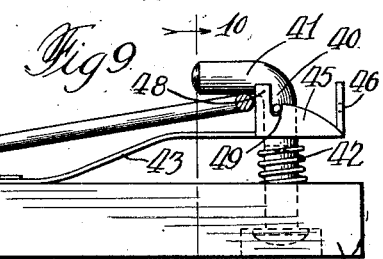
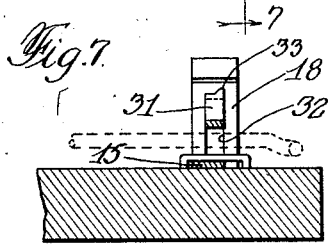
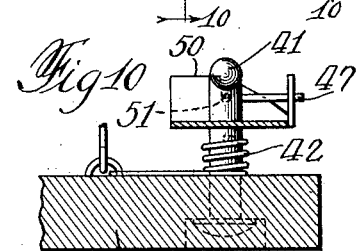
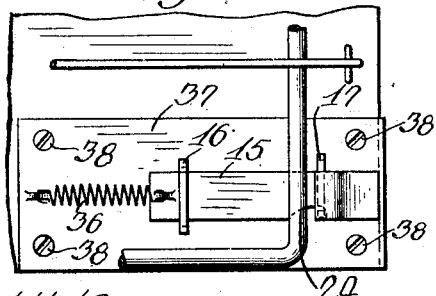

Patented July 24, 1928.

1,678,168

UNITED STATES PATENT OFFICE.

EMIEL P. SEGHERS, OF CHICAGO, ILLINOIS.

TRAP.

Application filed July 2, 1923. Serial No. 648,900.

This invention relates to traps for mice, rats, and other animals, and has for its object the provision of means for facilitating setting of the trap which shall make the setting operation easy and safe.

The invention is exemplified in the combination and arrangement of parts shown in the accompanying drawings and described in the following specification, and it is more particularly pointed out in the appended claims.

In the drawings—

Fig. 1 is a plan view of a trap embodying one form of the present invention;

Fig. 2 is an elevation of the trap shown in Fig. 1;

Fig. 3 is a fragmentary plan view of a portion of the mechanism shown in Fig. 1 with the parts in a different position of adjustment;

Fig. 4 is a section on line 4—4 of Fig. 3;

Fig. 5 is a fragmentary top plan view of a slightly modified form of the invention;

Fig. 6 is an elevation of the mechanism shown in Fig. 5;

Fig. 7 is a section on line 7—7 of Fig. 6;

Fig. 8 is a fragmentary plan view of another modification;

Fig. 9 is an elevation of the mechanism shown in Fig. 8;

Fig. 10 is a section on line 10—10 of Fig. 9;

Fig. 11 is a top plan view of another modified form of the invention; and

Fig. 12 is an elevation of the mechanism shown in Fig. 11.

In setting various forms of traps there is always danger of catching the hands and this danger is especially great in heavy traps such as are used for rats and larger animals, and even in the setting of small traps such as are used for catching mice the fingers may be painfully injured by accidental springing of the traps during the setting operation.

The present invention provides an automatically operating means which renders accidental springing of the trap during the setting thereof practically impossible.

In Figs. 1 and 2 of the drawings a well-known form of trap is shown having a baseboard 10 provided with a spring fall or jaw 11. A retainer rod 12 is pivotally connected to the base 10 by a staple 13 and engages the fall 11, as shown in broken lines in Fig. 2, to retain the fall in set position. The bar 12 is held by a trigger 14 upon which the bait is placed and which is sprung by the animal in a well-known manner to release the spring fall.

Mounted on the base 10 in position to engage the fall 11 when it is in its open or set position is a bar 15 held in place by a pair of staples 16 and 17 which permit longitudinal sliding movement of the bar. The rear end of the bar 15 is bent upwardly, as shown at 18, and the top portion is re-bent forwardly and downwardly to form a hook 19 having the upper face thereof inclined forwardly and downwardly.

A spring 20 is secured at 21 to the upper face of the base 10 and engages a tongue 22 bent to form an eye for receiving the end of the spring. The spring 20 resiliently holds the bar 15 in its forward position, as shown in Figs. 1 and 2, so that the upstanding portion 18 engages the staple 17. When the fall 11 is moved to its open position the cross-bar 23 thereof engages the inclined face 19 and forces the bar 15 rearwardly until the end of the hook 19 snaps past the bar 23 whereupon the spring 20 moves the bar 15 forwardly until the upright 18 engages the cross-bar 23. This brings the hook 19 over the cross-bar 23 so that the fall is retained in its open position to permit adjustment of the retainer 12 and trigger 14 without danger of releasing the fall. It will be seen that the hook 19 is of a sufficient height above the base 10 to permit the retainer 12 to press the bar 23 downwardly during the setting of the trap so that the spring action of the fall will exert a pressure on the retainer 12 to permit proper cooperation between the retainer and the trigger. In this manner the hook 19 acts as a safety catch to prevent the trap from springing during setting, but does not in any way interfere with the setting operation.

The bar 15 is provided with a notch 24 so that when the trap is set the upright 18 may be grasped by the operator and the bar 15 drawn backwardly against the tension of the spring 20 until the notch 24 comes opposite the leg of the staple 17. The bar 15 may then be moved to one side to bring the notch into engagement with the leg of the staple so that the safety catch will thus be held in the rearward position shown in broken lines in Fig. 1 in which position it will not interfere with the proper springing of the trap by pressure on the trigger 14. It will be noted that the notch 24 is in the form of a hook so that the spring 20 will positively retain the notch in engagement with the leg of the staple when it has once been placed in this position. The notch 24 is so located that when the bar 15 is moved backwardly by the action of the fall on the beveled face 19 the notch 24 will not be brought into registration with the leg of the staple. This leaves the bar 15 free to spring forwardly into retaining position after the bar 23 has passed the hook 19.

If at any time the spring 20 should be broken or misplaced the parts may be caused to operate automatically by holding the base 10 in an inclined position with the forward end down so that the bar 15 will drop by gravity to its retaining position. The bar may be provided with a safety notch 25 which can be moved into engagement with a leg of the staple 17 when the bar is in its retaining or forward position so that the safety hook will be locked in operative position. This additional notch 25 is not essential, but is added as an extra precaution for those who care to lock the safety hook in operative position during the setting of the trap. In some cases it may be desirable to provide an automatically operating catch to retain the safety lock in its retracted position should the operator for any reason fail to properly engage the notch 24 with the leg of the staple after the trap has been set. Such a catch is shown in Figs. 1 to 4 of the drawings and is pivotally mounted on a staple 26 and provided with a nosepiece 27 arranged to engage a notch 28 in the bar 15. A spring normally presses the nose 27 against the top face of the bar 15. The notch 28 is so located that when the bar 15 is retracted sufficiently to clear the fall the nose 27 will enter the notch 28 and retain the bar 15 in retracted position. The rearward movement of the bar 15 under the action of the fall against the inclined face 19 is not sufficient to bring the nose 27 and notch 28 into registration. A finger piece 30 is connected with the nosepiece 27 so that it may be lifted out of the notch 28 to free the bar 15 for forward movement under the impulse of the spring 20. Where the spring-pressed nosepiece and cooperative notch are used the notch 24 may be omitted if desired, although in some cases it may be desirable to provide the bar 15 with both retaining means as a precautionary measure to prevent the trap from being left locked in its open position after it has been set.

In the form of the invention shown in Figs. 5, 6 and 7, the safety catch is retained in its retracted position by a tongue 31 pivotally mounted on the staple 16 and projecting through a slot 32 in the upright portion 18 of the bar 15. The tongue 31 is provided with a lug 33 struck upwardly from one edge thereof in position to engage the upright 18 and retain the safety catch in its retracted position, as shown in Fig. 6. A coil spring 34 resiliently swings the tongue 31 upwardly about the staple 16 so as to cause the lug 33 to automatically engage the safety catch and retain it in its retracted position when the catch is moved backwardly. The spring 20 may be given an upward as well as a rearward action and the tongue 31 may be provided with a downwardly extending projection 35 to engage the top face of the bar 15. In this way the spring 20 may be caused to exert an upward force on the tongue 31 to bring the lug 33 into operative relation with the upper end of the notch 32. Where this arrangement is made the tongue 31 will continue to operate automatically even though the coil spring 34 should be broken or misplaced.

In Fig. 11, the bar 15 is shown as provided with a coil spring 36 for exerting forward tension thereon in place of the wire 20 shown in the other figures. It will also be noted that in the form shown in Figs. 11 and 12 the safety catch is slidably mounted on a detachable plate 37 which may be secured to the base 10 by screws 38 and which may also be provided with a flange 39 for engaging a groove or kerf cut in the end of the baseboard. This arrangement permits the safety catch to be furnished separately from the traps and attached thereto by the purchaser. The flange 39 provides a holding member for resisting the upward force of the spring jaw so that there is no danger of the screws 38 being pulled out by this force. The bar 15 in this form of the invention is shown as provided with a notch 24 for engaging one of the legs of the guide staple 17. The safety latch is shown in retracted position in full lines in Figs. 11 and 12 and shown in operating position in broken lines in Fig. 12.

In the form of the invention shown in Figs. 8, 9 and 10, a rotary retaining member 40 is shown having an arm 41 which is movable through an angle of substantially 90 degrees into and out of position across the path of the fall 23. A spring 42 is wound about the rod 40 and normally rotates the arm 41 in a clockwise direction, as viewed in Fig. 8. A leaf spring 43 is secured at 44 to the base 10 and carries a pair of cams 45 and 46 in position to engage a pin 47 projecting laterally from the rod 40. The cam 45 is provided with a stop 48 which limits the movement of the arm 41 to a position overlying the fall 23. The cam may also be provided with a retaining notch 49 to hold the arm 41 against accidental reverse movement, but the notch may be omitted since the spring normally prevents accidental reverse movement of the catch. The cam 46 is also provided with a limit stop 50 and a retaining notch 51, as shown in Figs. 8 and 10. By rotating the arm 41 in a counterclockwise direction the pin 47 will be brought into registration with the notch 51 and the spring 43 will automatically cause the notch to engage the pin and retain the arm 41 in the broken line position shown in Fig. 8.

In setting the trap, the arm 41 is first arranged in this broken line position and the jaw is then forced backwardly until it engages the top face of the spring 43. This will move the cam 46 downwardly a sufficient distance to release the pin 47 and permit the arm 41 to swing in a clockwise direction under the influence of the spring 42 until it is brought into the full line position shown in Fig. 8. Thus opening the jaw of the trap automatically releases the safety catch and brings it into position to prevent accidental springing of the jaw while the trap is being set. After the trap has been set it is only necessary to return the arm 41 to the broken position shown in Fig. 8, in which position it will be retained by the notch 51 and pin 47.

Referring again to Figs. 1 to 4 inclusive, it will be noted that when the safety catch is withdrawn it is held in its retracted position either by the notch 24 or by the detent 26. In operation, when the trap is sprung this retaining means will be disengaged, thus releasing the safety catch so that it will move forwardly under the influence of the spring 20 into operative position. Thus automatically the safety catch is returned to operative position to engage the jaw when it is again opened. The release of the safety catch will occur even when the jaw engages the body of an animal. This operation is of considerable importance, as otherwise the operator might at times forget to release the safety catch and attempt to set the trap with the safety catch in its inoperative position. If he should do so it would be necessary either to release the safety catch while he holds the jaw open or else release the jaw and then release the safety catch and repeat the operation.

It will be noted that the hook on the safety catch projects past the fall bar when the fall is engaged by the hook. When the parts are in this position the downwardly projecting end of the hook prevents the catch from sliding, so that if the operator should attempt to withdraw the catch prior to setting the trigger mechanism he would be unable to do so. When, however, the trigger mechanism has been set, the fall bar is depressed below the path of the hook so that the catch can be withdrawn to inoperative position.

I claim:—

1. A trap comprising a fall or jaw, trigger mechanism for releasably retaining said fall in set position, a safety catch for preventing operation of said fall arranged to automatically engage said fall when said fall is moved into position to be set, and means for retaining said catch out of operative position to permit operation of said fall.

2. A trap comprising a fall or jaw, and a safety catch for preventing operation of said fall while said trap is being set, said catch being provided with means for locking it in operative position.

3. In combination, a trap having a fall or jaw, a safety catch for preventing operation of said fall, resilient means for holding said catch in operative position, and means for positively locking said catch in its operative position.

4. A trap comprising a fall or jaw, a safety catch for preventing operation of said fall, resilient means for moving said catch into operative position, and means for retaining said catch out of operative position.

5. In combination, a trap comprising a fall or jaw, a safety catch for preventing operation of said fall arranged to move by gravity into position to engage said fall when said fall is opened and said trap is held in one position, said catch having means for engaging said fall to actuate said catch when said fall is opened to permit said fall and catch to move into operative relation, and means for retaining said safety catch out of cooperative relation with said fall.

6. In combination, a trap comprising a fall or jaw, a safety catch for preventing operation of said fall arranged to move by gravity into cooperative relation with said fall when said fall is opened and said trap is held in one position, and resilient means for assisting the action of gravity in said movement.

7. A trap comprising a fall or jaw, and a safety catch having a retaining member yieldingly held in the path of said fall when said fall is opened and arranged to be engaged by said fall and moved out of said path by said fall to permit opening of said fall and to automatically return to position in the path of said fall to prevent closing thereof.

8. A trap comprising a fall or jaw movable to open position, a catch adjacent the open position of said fall and having a beveled face for engaging said fall when said fall is opened so that said catch is forced by the movement of said fall out of the path thereof, and a spring for returning said catch into the path of said fall to prevent accidental closing of said fall.

9. In combination, a trap comprising a fall or jaw, a safety catch having a beveled face arranged to engage said fall when said fall is opened so that said catch is moved out of the path of said fall, a spring for returning said catch into position to prevent accidental closing of said fall, and means for retaining said catch out of operative relation with said fall.

10. A trap comprising a fall or jaw, trigger mechanism for releasably holding said fall in open position, a safety catch for preventing accidental release of said fall during the setting of said trigger mechanism having a cam face actuated by said fall during the opening movement thereof to permit movement of said fall in one direction past said catch, said catch having means for intercepting return movement of said fall, and means for retaining said catch out of operative relation with said fall.

11. A trap comprising a spring actuated fall or jaw, trigger mechanism for retaining said fall in open position, a safety catch for said fall movable automatically into operative relation therewith when said fall is opened, and means for retaining said catch out of operative relation with said fall, said catch when in operative position being arranged in the path of said fall but out of contact therewith when said fall is retained by said trigger mechanism.

12. A trap having a fall or jaw and a safety catch therefor comprising a longitudinally slidable bar having a hook thereon for engaging said fall, and means for retaining said hook out of the path of said fall to permit operation of said trap.

13. In combination, a trap having a fall or jaw, a safety catch for said fall comprising a bar slidably mounted on said trap and having a retaining member movable into and out of the path of said fall, a spring for sliding said bar to bring said retaining member into the path of said fall, and means for holding said retaining member out of the path of said fall against the action of said spring.

14. In combination, a trap comprising a fall or jaw, and a safety catch for said fall comprising a bar slidably mounted on said trap and having a retaining member thereon movable into and out of the path of said fall and arranged to automatically move into position when said fall is opened to prevent accidental operation thereof.

15. A trap comprising a base plate, a spring actuated fall mounted thereon, trigger mechanism for retaining said fall in set position, a bar slidably mounted on said base plate and having a retaining member thereon spaced upwardly from said base plate, resilient means for holding said bar in position with said retaining member in the path of said fall, said retaining member having a cam face for engaging said fall to permit said fall to pass said retaining member during the opening movement thereof, and means for holding said retaining member out of the path of said fall.

16. In combination, a trap having a base member, a spring actuated fall mounted thereon, a bar slidably mounted on said base member and having a retaining member mounted thereon, resilient means for holding said bar in position with said retaining member in the path of said fall, said retaining member having a cam face for permitting said fall to pass said retaining member when said fall is opened, and a stop for holding said retaining member out of the path of said fall, said bar having a notch therein for engaging said stop.

17. A trap comprising a base member having a spring fall thereon and a safety catch for said fall comprising a flat bar having an upwardly projecting portion at one end and a downwardly bent hook thereon forming a cam for engaging said fall when said fall is opened, a spring for retaining said hook in the path of said fall, and a guide member for said bar, said bar having a shoulder thereon for engaging said guide member to retain said hook out of the path of said fall.

18. A trap comprising a base member having a spring fall thereon, a safety catch for said fall comprising a bar slidably mounted on said base member and provided with a detent for engaging said fall, said bar being movable on said base member to bring said detent out of the path of said fall, and means for automatically locking said detent out of the path of said fall when it is moved to its inoperative position.

19. In combination, a trap comprising a base member having a spring fall mounted thereon, a safety catch for said fall comprising a bar slidably mounted on said base member and provided with a detent, resilient means for retaining said detent in the path of said fall, and a spring catch for automatically locking said detent out of operative position when said bar is moved to bring said detent out of the path of said fall.

20. A trap having a fall or jaw member, trigger mechanism for releasably holding said jaw member in set position, and a freely movable longitudinally slidable safety catch for preventing accidental release of said jaw during setting of said trigger mechanism and guides for directing said catch to move in the direction of movement of said jaw member.

21. A trap comprising a jaw, trigger mechanism for holding said jaw in set position, a freely movable longitudinally slidable safety catch positioned adjacent the set position of said jaw for preventing accidental release of said jaw during the setting of said trigger mechanism, guides for directing said catch to move in the direction of movement of said jaw, and means for retaining said safety catch out of operative relation with said jaw.

22. A trap comprising a jaw, trigger mechanism for releasably holding said jaw in set position, a longitudinally slidable safety catch positioned adjacent the set position of said jaw, a spring for automatically moving said catch into operative relation with said jaw, and means for retaining said catch in inoperative position.

23. A trap comprising a jaw, trigger mechanism for holding said jaw in set position, a safety catch for preventing release of said jaw during the setting of said trigger mechanism, and means for retaining said jaw out of operative position, said retaining means being disengageable by jar.

24. A trap comprising a jaw, trigger mechanism for holding said jaw in open position, a safety catch automatically actuated by said jaw when opened for preventing release of said jaw, yielding means for moving said catch into operative position, and means for retaining said jaw out of operative position, said retaining means being releasable by jar imparted to said trap when said jaw is sprung.

25. A trap comprising a jaw, trigger mechanism for holding said jaw in set position, a safety catch operable by said jaw when opened for preventing accidental closing of said jaw, and means for retaining said catch out of operative position, said retaining means being releasable by the springing of said trap.

26. A trap comprising a jaw, trigger mechanism for holding said jaw in set position, a safety catch for preventing accidental release of said jaw, a spring for moving said catch into position to be engaged by said jaw when said jaw is opened, and means for retaining said catch out of said position, said retaining means being releasable when said trap is sprung.

27. A trap comprising a fall bar, a safety catch slidably mounted on said trap and having a hook thereon to engage said bar, said hook acting to prevent sliding of said catch when in engagement with said bar.

28. A trap comprising a fall bar, trigger mechanism for holding said bar in set position, a safety catch for said bar slidably mounted on said trap for movement into and out of the path of said bar, said catch having means thereon for preventing said catch from moving out of the path of said bar when said catch is engaged by said bar but arranged to permit such movement when said bar is held by said trigger mechanism.

In testimony whereof I have signed my name to this specification on this 29th day of June, A. D. 1923.

EMIEL P. SEGHERS.